United States Patent
El-Shaarawi et al.

(10) Patent No.: US 9,488,394 B1
(45) Date of Patent: Nov. 8, 2016

(54) SYSTEM AND METHOD FOR CONTINUOUSLY OPERATING A SOLAR-POWERED AIR CONDITIONER

(71) Applicant: King Fahd University of Petroleum and Minerals, Dhahran (SA)

(72) Inventors: Maged A. I. El-Shaarawi, Dhahran (SA); Syed A. M. Said, Dhahran (SA); Ali Abdulaziz Al-Ugla, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/838,557

(22) Filed: Aug. 28, 2015

(51) Int. Cl.
F25B 27/00 (2006.01)
F24J 2/34 (2006.01)
F24F 5/00 (2006.01)

(52) U.S. Cl.
CPC ........... *F25B 27/007* (2013.01); *F24F 5/0014* (2013.01); *F24F 5/0017* (2013.01); *F24J 2/345* (2013.01); *F24F 2005/0032* (2013.01); *F24F 2005/0064* (2013.01)

(58) Field of Classification Search
CPC .............. F24F 2005/0064; F24F 2005/0032; F24F 5/0014; F24F 5/0017; F24J 2/345; F25B 27/002
See application file for complete search history.

(56) References Cited

U.S. PATENT DOCUMENTS

| | | | |
|---|---|---|---|
| 4,070,870 A * | 1/1978 | Bahel | F24D 11/003 237/2 B |
| 4,164,125 A | 8/1979 | Griffiths | |
| 4,178,989 A * | 12/1979 | Takeshita | F24D 11/0221 165/62 |
| 4,205,529 A | 6/1980 | Ko | |
| 6,536,677 B2 | 3/2003 | Melendez-Gonzalez et al. | |
| 6,539,738 B2 | 4/2003 | Gonzalez-Cruz et al. | |
| 2014/0352304 A1* | 12/2014 | Arias | F03G 6/067 60/641.15 |

OTHER PUBLICATIONS

El-Shaarawi, "Alternative Designs for a 24-Hours Operating Solar-Powered LiBr-Water Absorption Air-conditioning Technology," International Journal of Refrigeration, Jan. 2015 (Abstract only).
Li, et al., "Technology development in the solar absorption air-conditioning systems," Renewable and Sustainable Energy Reviews 4, (2000), pp. 267-293.
Chien, et al., "Experimental Investigation on an Absorption Refrigerator Driven by Solar Cells," International Journal of Photoenergy, vol. 213, (2013), 5 pages.

* cited by examiner

*Primary Examiner* — Len Tran
*Assistant Examiner* — Ana Vazquez
(74) *Attorney, Agent, or Firm* — Oblon, McClelland, Maier & Neustadt, L.L.P.

(57) ABSTRACT

An air-cooled, single-effect, air conditioning system includes a first set of solar collectors configured to obtain energy to facilitate release of refrigerant from an absorbent-refrigerant solution in a generator. A tank is configured to store the energy for nighttime operations of the air conditioning system. One or more valves are configured to regulate consumption of the stored energy to maintain continuous cooling of at least one load.

20 Claims, 4 Drawing Sheets

SYSTEM AND METHOD FOR CONTINUOUSLY OPERATING A SOLAR-POWERED AIR CONDITIONER

BACKGROUND

Technical Field

The present disclosure relates to continuously (24-hour a day) operating solar-powered lithium-bromide (LiBr), air-cooled, single-effect, air conditioning systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electricity consumption by air conditioning systems can be reduced by employing solar collectors to harness solar energy resources. However, solar collectors are only able to gather energy during the daylight hours. To extend operational hours of these systems, energy storage tanks are used to achieve 24-hour a day operation.

SUMMARY

In an exemplary embodiment, an air-cooled, single-effect, air conditioning system includes a first set of solar collectors configured to obtain energy to facilitate release of refrigerant from an absorbent-refrigerant solution in a generator. A tank is configured to store the energy for nighttime operations of the air conditioning system. One or more valves are configured to regulate consumption of the stored energy to maintain continuous The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
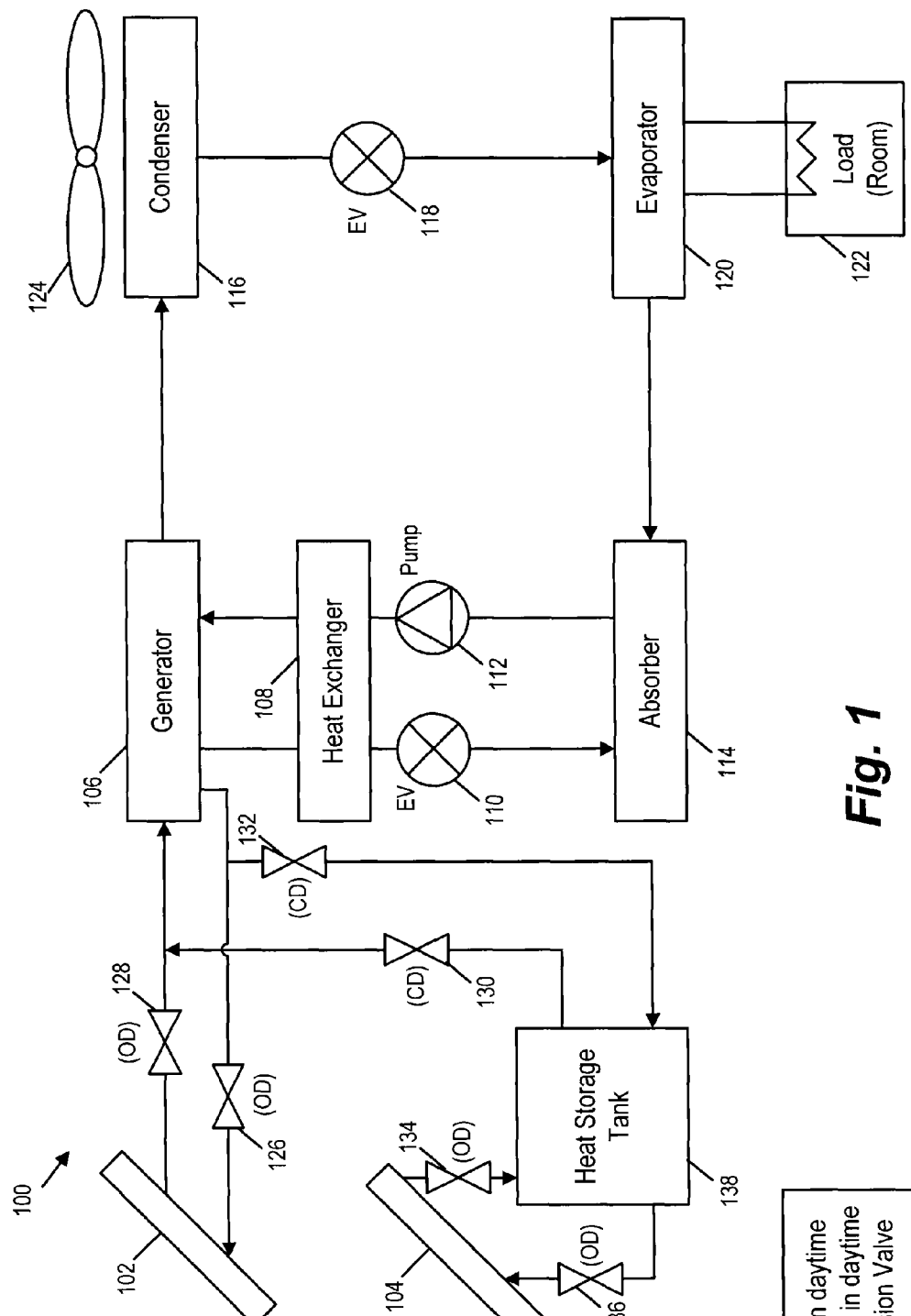
FIG. 1 is an exemplary illustration of a solar-powered, air-cooled, single-effect, air conditioning system utilizing hot thermal storage, according to certain embodiments.

In the drawings, like reference numerals designate identical or corresponding parts throughout the several views. Further, as used herein, the words "a," "an" and the like generally carry a meaning of "one or more," unless stated otherwise. The drawings generally illustrate schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to solar-powered LiBr-water absorption air-conditioning technologies. The embodiments described herein provide for continuous operation of the air-conditioning systems one of the three thermal energy storage implementations described herein. According to the embodiments described herein, continuous operations refer to twenty-four hours per day operations in both daytime hours when the solar energy from the sun is highest and during nighttime hours when the solar energy from the sun is weakest or absent. In certain implementations, systems with solar thermal storage have advantages over other solar thermal air conditioning systems in terms of system performance improvements and energy savings. The implementations herein describe using one of three solar thermal storage techniques, such as heat storage, cold storage, and refrigerant storage, to allow for continuous operation of the solar-powered air conditioning systems.

FIG. 1 is an exemplary illustration of a solar-powered air conditioning system 100 utilizing heat storage, according to certain embodiments. The air conditioning system 100 includes a first set of solar collectors 102 and a heat storage tank 138 that are connected to generator 106 where an absorbent-refrigerant solution is heated until the refrigerant is released from the absorbent. During daytime operations when incident solar radiation is high enough that the solar energy collected at the first set of solar collectors 102 enables predetermined operating temperatures of the generator 106 to be reached, the first set of solar collectors 102 are aligned to provide heat directly to the generator 106 by opening valve 126 and valve 128. In addition, during daytime hours, valves 130 and 132 are closed to cut off the flow path from the heat storage tank 138 to the generator 106.

During nighttime hours and when the incident solar radiation at the first set of solar collectors 102 is insufficient to enable the predetermined operating temperatures of the generator 106 to be reached, the heat storage tank 138 is aligned to provide heat to the generator 106 by opening valve 130 and valve 132. In addition, during nighttime hours, valves 126 and 128 are closed to cut off the flow path from the first set of solar collectors 102 to the generator 106. The heat storage tank 138 is also connected to a second set of solar collectors 104 via valve 134 and valve 136. Valves 134 and 136 are open during the daylight hours so that the solar energy captured by the second set of solar collectors 104 can be stored in the heat storage thank 138 until the nighttime hours when the thermal energy stored in the heat storage tank is used to maintain operational temperatures in the generator 106. In certain embodiments, the second set of solar collectors 104 operates at higher temperatures than the first set of solar collectors 102 provides heat to the heat storage tank 138 at higher temperatures to be used for nighttime operations. According to some implementations, a coefficient of performance (COP) for the solar-powered air conditioning system 100 is higher during the nighttime hours when the heat storage tank 138 provides heat to the generator 106 than during daytime hours when the first set of solar collectors 102 provides heat to the generator 106.

The heat storage tank 138 holds a heat-absorbing fluid, such as water, which stores heat during the day when the solar energy from the first set of solar collectors 102 can maintain operational temperatures of the generator 106 and the rest of the solar-powered air conditioning system 100. The volume, storage pressure, storage temperature, and insulation characteristics of the heat storage tank 138 are based on design operational capabilities of the solar-powered air conditioning system 100. The heat storage tank 138 allows the cooling demands of loads of the solar-powered air conditioning system 100 to be continuously maintained during both daytime and nighttime operations.

According to one implementation, the generator 106 includes a set of tubes routed through an interior of an outer shell that holds the absorbent-refrigerant solution. In the embodiments described herein, the absorbent-refrigerant solution is LiBr-water. Water heated by the solar energy from the first set of solar collectors 102 or from the heat storage tank 138 passes through the tubes and heats the absorbent-refrigerant solution until the refrigerant (water) is released from the absorbent (LiBr). The strong-in-absorbent solution then travels to the absorber 114 via expansion valve 110, and the vapor refrigerant travels to the condenser 116. Other configurations of the generator 106 can also be used.

The refrigerant experiences a throttling process as it passes to evaporator 120 and then to absorber 114. The refrigerant vapor is condensed to a liquid at the condenser 116 via an air fan 124 that blows cooler ambient air into the condenser 116. The condensed liquid refrigerant then flows through expansion valve 118 into evaporator 120 where the refrigerant provides cooling to a load 122, such as one or more rooms of a building. In one implementation, the evaporator 120 drips or sprays refrigerant onto tubes providing cooling water flow to the load 122, and the refrigerant expands within the evaporator, which may be maintained at a vacuum. The refrigerant then passes to the absorber 114 to be reabsorbed by the absorbent to produce the absorbent-refrigerant solution.

The strong-in-refrigerant absorbent-refrigerant solution is then pumped from the absorber 114 to the generator 106 via pump 112, which completes a cycle of the solar-powered air conditioning system. Between the absorber 114 and the generator 106, the absorbent-refrigerant solution passes through liquid-liquid heat exchanger 108, which increases the efficiency of the air conditioning system 100. Any heat rejected during a cycle of the system is via natural convection or a forced fan. According to certain embodiments, the pump 112 is the only component of the air conditioning system 100 that receives electrical power from an external source other than the first set of solar collectors 102 or the second set of solar collectors 104. Also, the pump 112 consumes less than 0.1% of the total energy consumed by the air conditioning system 100.

Figure 2:
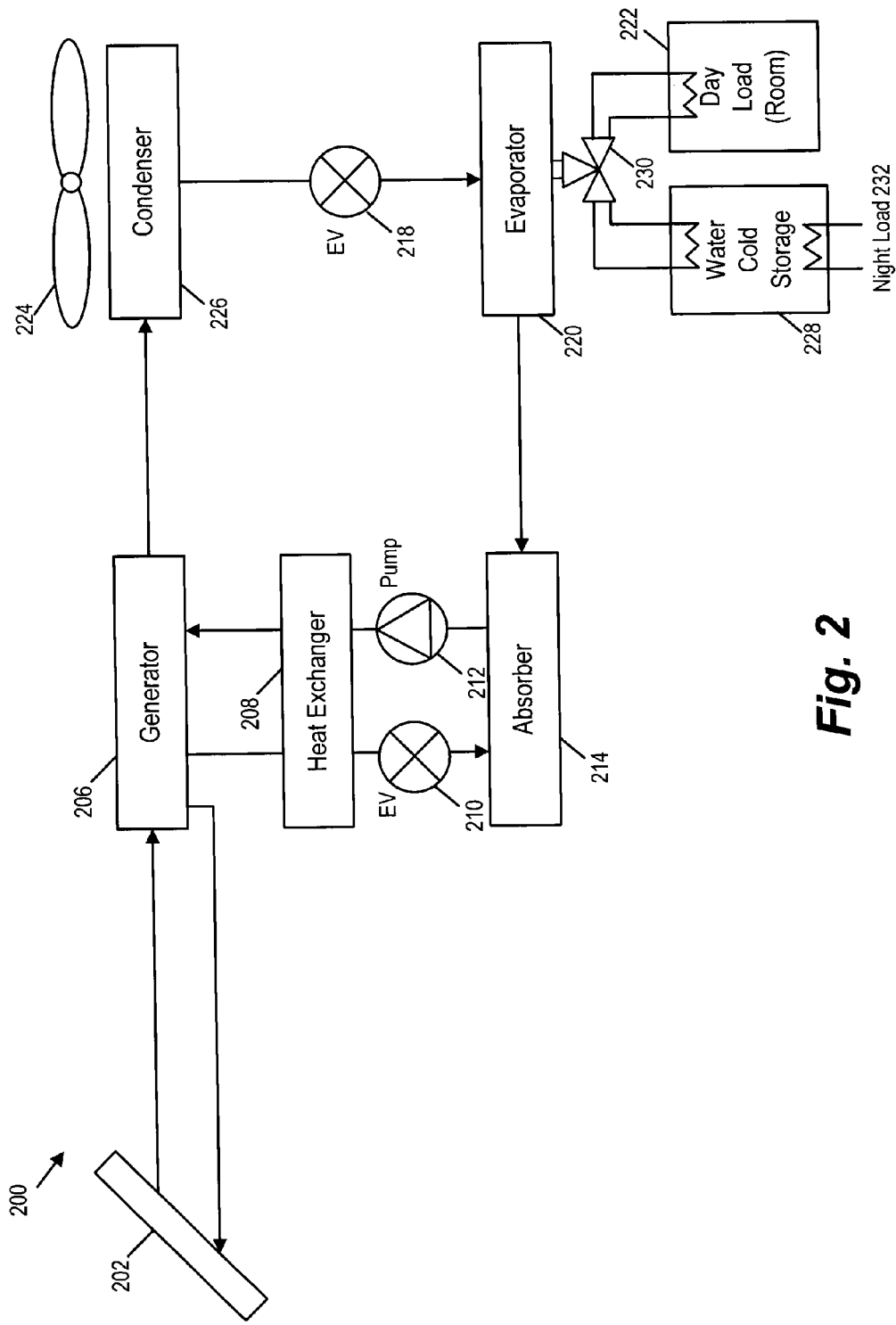
FIG. 2 is an exemplary illustration of a solar-powered, air-cooled, single-effect, air conditioning system utilizing cold thermal storage, according to certain embodiments.

FIG. 2 is an exemplary illustration of a solar-powered air conditioning system 200 utilizing cold thermal storage, according to certain embodiments. The air conditioning system 200 includes solar collectors 202 connected to generator 206 where an absorbent-refrigerant solution is heated until the refrigerant is released from the absorbent. During daytime operations when the incident solar radiation is high enough that the solar energy collected at the solar collectors 202 enable predetermined operating temperatures of the generator 106 to be reached, the solar collectors 202 provide heat to the generator 206. In one implementation, the components of the air conditioning system 200, such as the generator 206, condenser 226, air fan 224, evaporator 220, absorber 214, pump 212, and expansion valves 210 and 218, operate during the daytime hours when the solar collectors 202 provide heat to the generator 206. During the nighttime hours when the solar energy collected at the solar collectors 202 is insufficient to maintain operating temperatures at the generator 206, the components of the air conditioning system 200 cease to operate, and cold storage tank 228 located downstream of the evaporator 220 provides cold water to directly cool at least one nighttime load 232.

According to one implementation, the generator 206 includes a set of tubes routed through an interior of an outer shell that holds the absorbent-refrigerant (LiBr-water) solution. Water heated by the solar energy from the solar collectors 202 passes through the tubes and heats the absorbent-refrigerant solution until the refrigerant (water) is released from the absorbent (LiBr). The strong-in-absorbent (weak-in-refrigerant) solution then travels to the absorber 214 via expansion valve 210, and the vapor refrigerant travels to the condenser 226. Other configurations of the generator 206 can also be used.

The refrigerant experiences a throttling process as it passes to evaporator 220 and then to absorber 214. The refrigerant vapor is condensed to a liquid at the condenser 216 via an air fan 224 that blows cooler ambient air into the condenser 216. The condensed liquid refrigerant then flows through expansion valve 218 into evaporator 220 where the refrigerant provides cooling to at least one daytime load 222, such as one or more rooms of a building. In one implementation, the evaporator 220 drips or sprays refrigerant onto tubes providing cooling water flow to the load 222, and the refrigerant expands within the evaporator 220, which may be maintained at a vacuum. The refrigerant passes through three-way valve 230 to provide cooling to the daytime load 222. The three-way valve 230 regulates refrigerant flow and redirects excess refrigerant to the cold storage tank 228. The excess refrigerant cools the water that is stored in the cold storage tank 228 until nighttime hours when the heat input from the solar collectors 202 is insufficient to separate the refrigerant from the absorbent-refrigerant solution at the generator 206. In one implementation, the three-way valve 230 is manually operated to achieve predetermined rates of refrigerant flow to cool the daytime load 222 and to store in the cold storage tank 228. The position of the three-way valve 230 can also be controlled via circuitry based on changing load demands throughout the day.

The cold storage tank 228 is introduced downstream of evaporator 220 a pathway for the excess refrigerant flowing through the three-way valve 230. The cold storage tank 228 can hold a phase change material to condense the vapor refrigerant and store cold thermal energy to provide cooling to at least one nighttime (and when solar insulation is insufficient during daytime) load 232. The volume, storage pressure, storage temperature, and insulation characteristics of the cold storage tank 228 are based on design operational capabilities of the air conditioning system 200. The cold storage tank 228 allows the cooling demands of loads of the air conditioning system 200 to be continuously maintained during both daytime and nighttime operations. Losses to the environment from the cold storage tank 228 may be lower than the losses from the heat storage tank 138 due to a lower temperature difference between working and ambient temperatures. By using the cold storage tank 228, a cooling effect is produced during the day with the operation of the air conditioning system 200 in conjunction with the solar collectors 202, and the excess of the daytime load 228 is stored for later use when the heat input is not sufficient to separate the refrigerant from the absorbent-refrigerant solution in the generator 206. In addition, complexity of the air conditioning system 200 is less than the air conditioning system 100 with the heat storage tank 138 because fewer valves are repositioned during operation of the air conditioning system 200 with the cold storage tank 228 downstream of the evaporator 220.

Once the refrigerant has cooled the at least one daytime load 222 or the at least one nighttime load 232 via the cold storage tank 228, the refrigerant then passes to the absorber 214 via the three-way valve 230 and the evaporator 220 to be reabsorbed by the weak-in-refrigerant (strong-in-absorbent) solution to produce the strong-in-refrigerant solution. The refrigerant-absorbent solution is then pumped from the absorber 214 to the generator 206 via pump 212, which completes a cycle of the air conditioning system 200. Between the absorber 214 and the generator 206, the refrigerant-absorbent solution passes through heat exchanger 208, which increases the efficiency of the air conditioning system 200. Any heat rejected during a cycle of the air conditioning system 200 is via natural convection or a forced fan. According to certain embodiments, the pump 212 is the only component of the air conditioning system 200 that receives electrical power from an external source other than the solar collectors 202. In addition, the pump 212 consumes less than 0.1% of the total energy consumed by the air conditioning system 200.

Figure 3:
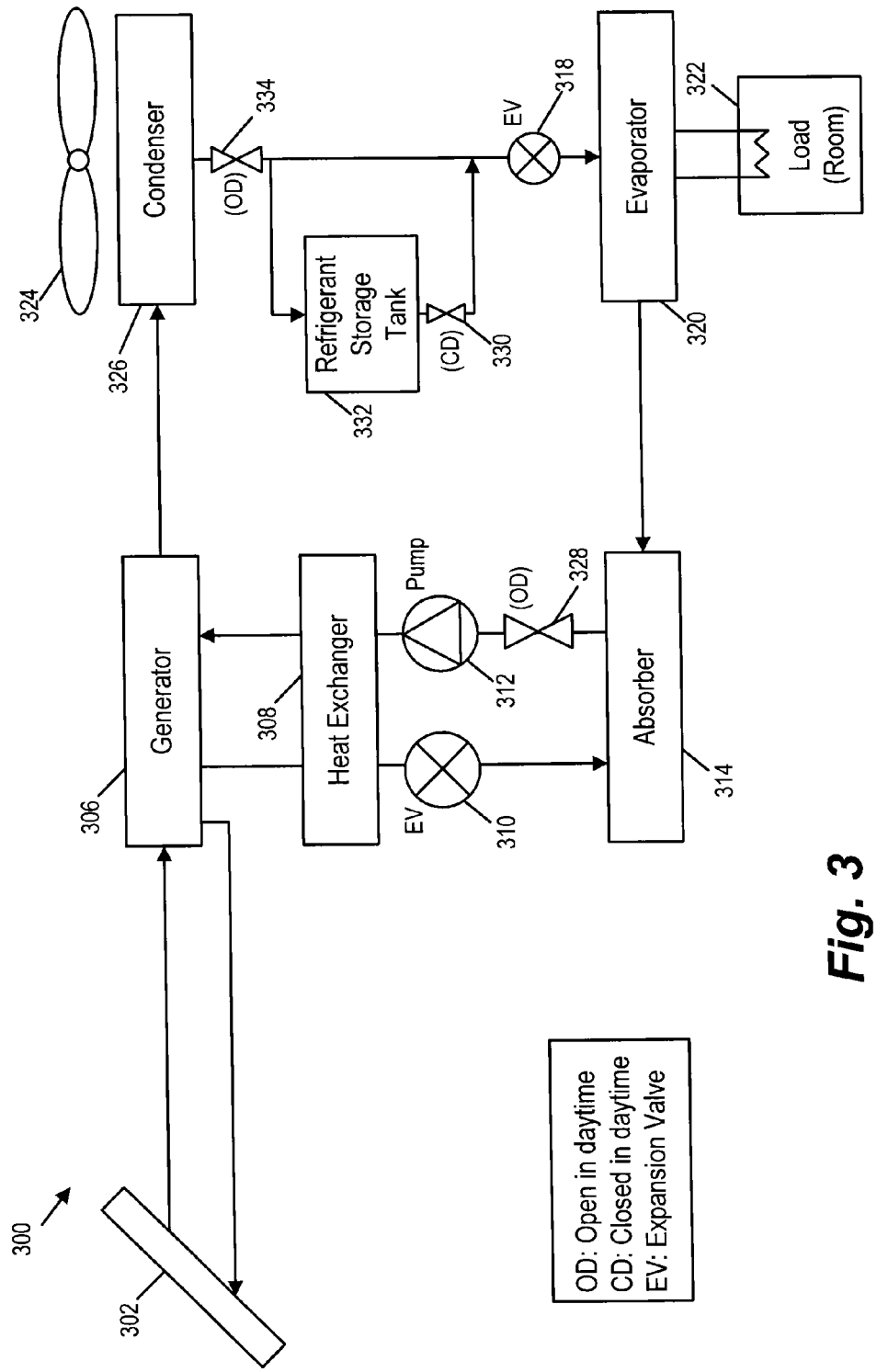
FIG. 3 is an exemplary illustration of a solar-powered, air-cooled, single-effect, air conditioning system utilizing refrigerant storage, according to certain embodiments.

FIG. 3 is an exemplary illustration of a solar-powered air conditioning system 300 utilizing refrigerant thermal storage, according to certain embodiments. The air conditioning system 300 includes solar collectors 302 connected to generator 306 where an absorbent-refrigerant solution (LiBr-water) is heated until the refrigerant is released from the absorbent. In some embodiments, the size of solar collectors 302 is less than the size of solar collectors 102, 104, and 202 due to smaller load demands on the air conditioning system 300 because of reduced heat losses throughout the system. During daylight hours when incident solar radiation is high enough that the solar energy collected at the solar collectors 302 enables predetermined operating temperatures of the generator 306 to be reached, the solar collectors 302 provide heat to the generator 306. During the nighttime hours when the solar energy collected at the solar collectors 302 is insufficient to maintain operating temperatures at the generator 306, refrigerant storage tank 332 located downstream of the condenser 326 provides refrigerant to cool at least one load 322.

According to one implementation, the generator 306 includes a set of tubes routed through an interior of an outer shell that holds the absorbent-refrigerant (LiBr-water) solution. Water heated by the solar energy from the solar collectors 302 passes through the tubes and heats the refrigerant-absorbent solution until the refrigerant (water) is released from the absorbent (LiBr). The strong-in-absorbent solution then travels to the absorber 314 via expansion valve 310, and the vapor refrigerant travels to the condenser 326. Other configurations of the generator 306 can also be used. The refrigerant storage tank 332 is connected downstream of the condenser via condenser outlet valve 334 and refrigerant storage isolation valve 330. Condenser outlet valve 334 remains open during daytime hours to regulate the flow of refrigerant from the condenser 326 to the refrigerant storage tank 332. Refrigerant storage isolation valve 330 remains shut during daytime hours so that refrigerant accumulates in the refrigerant storage tank 332 and can be used to cool the at least one load 332 during the nighttime hours. During nighttime hours, the position of the refrigerant storage isolation valve 330 can be manually operated to regulate the flow of refrigerant from the refrigerant storage tank 332 to the evaporator 320. The position of the valve 330 can also be controlled via circuitry based on changing load demands throughout the nighttime hours.

The refrigerant storage tank 332 holds condensed refrigerant from the condenser 326 during the day when the solar energy from the solar collectors 302 can maintain operational temperatures of the generator 306 and the rest of the air conditioning system 300. The volume, storage pressure, storage temperature, and insulation characteristics of the refrigerant storage tank 332 are based on design operational capabilities of the air conditioning system 300. In some implementations, the storage pressure of the refrigerant storage tank 332 is lower than the heat storage tank 138 and the cold storage tank 228, which means that minimum strength requirements for the refrigerant storage tank 332 are also reduced. In addition, the refrigerant storage tank may have thin insulation, and the losses from the tank may be lower than the heat storage tank 138 because the refrigerant storage occurs at approximately room temperature. The refrigerant storage tank 332 allows the cooling demands of loads of the solar-powered air conditioning system 300 to be continuously maintained during both daytime and nighttime operations.

The refrigerant experiences a throttling process as it passes to evaporator 320 and then to absorber 314. The refrigerant vapor is condensed to a liquid at the condenser 326 via an air fan 324 that blows cooler ambient air into the condenser 326. The condensed liquid refrigerant then flows through expansion valve 318 into evaporator 320 where the refrigerant provides cooling to at least one load 322, such as one or more rooms of a building. In one implementation, the when the refrigerant reaches the evaporator 320, refrigerant is dripped or sprayed onto tubes providing cooling water flow to the load 322, and the refrigerant expands within the evaporator 320, which may be maintained at a vacuum.

Once the refrigerant has cooled the at least one load 322, the refrigerant then passes to the absorber 314 to be reabsorbed by the strong-in-absorbent solution to produce the strong-in-refrigerant solution. Valve 328 is open during the daytime hours and closed during the nighttime hours. The absorbent-refrigerant solution is then pumped from the absorber 314 to the generator 306 via pump 312, which completes a cycle of the air conditioning system 300. Between the absorber 314 and the generator 306, the absorbent-refrigerant solution passes through heat exchanger 308, which increases the efficiency of the air conditioning system 300. Any heat rejected during a cycle of the air conditioning system 300 is via natural convection or a forced fan. According to certain embodiments, the pump 312 is the only component of the air conditioning system 300 that receives electrical power from an external source other than the solar collectors 302. In addition, the pump 312 consumes less than 0.1% of the total energy consumed by the conditioning system 300.

Figure 4:
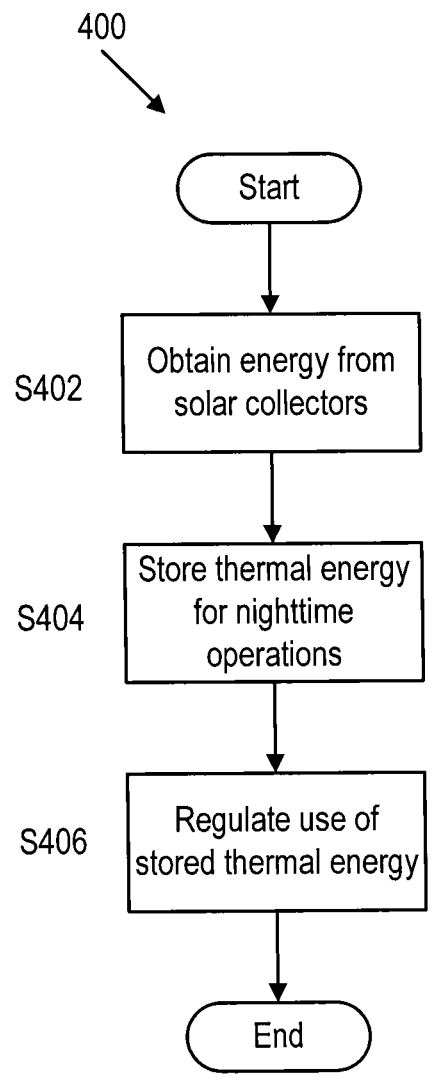
FIG. 4 is an exemplary illustration of a method for performing continuous solar-powered air conditioning, according to certain embodiments.

FIG. 4 is an exemplary illustration of a method for performing continuous solar-powered air conditioning 400, according to certain embodiments. The steps of the method can be applied to the embodiments of the solar-powered air conditioning system described previously herein. At step S402, solar energy is obtained via one or more sets of solar collectors. The air conditioning system 100 with the heat storage tank 138 described with respect to FIG. 1 includes a first set of solar collectors 102 connected to the generator 106 and a second set of solar collectors 104 connected to the heat storage tank 138. During daylight hours when incident solar radiation is high enough that the solar energy collected at the first set of solar collectors 102 enables predetermined operating temperatures of the generator 106 to be reached, the first set of solar collectors 102 are aligned to provide heat to the generator 106 by opening valve 126 and valve 128. The solar energy captured by the second set of solar collectors 104 can be stored in the heat storage thank 138 until the nighttime hours when the thermal energy stored in the heat storage tank is used to maintain operational temperatures in the generator 106. For the air conditioning system 200 with the cold storage tank 228 described by FIG. 2 and the air conditioning system 300 with the refrigerant storage tank 332 described by FIG. 3, one set of solar collectors 202 or 302 and connected to generator 206 or 306 to maintain operation generator temperatures.

At step S404, thermal energy is stored for nighttime operations. The air conditioning system 100 illustrated by FIG. 1 includes the heat storage tank 138 for storing thermal energy accumulated by the second set of solar collectors 104 during daytime hours to be used to maintain operational temperatures in the generator 106 during the nighttime hours. The air conditioning system 200 illustrated by FIG. 2 includes the cold storage tank 228 downstream from the evaporator 220 for storing cold thermal energy that is an excess of the daytime load 222 of the air conditioning system 200. The air conditioning system 300 illustrated by FIG. 3 includes the refrigerant storage tank 332 downstream from the condenser 326 to hold condensed refrigerant from the condenser 326 during the day when the solar energy from the solar collectors 302 can maintain operational temperatures of the generator 306 and the rest of the air conditioning system 300.

At step S406, the use of the stored thermal energy is regulated to maintain continuous cooling of at least one load of the air conditioning system. For the air conditioning system 100 described by FIG. 1, during daytime hours, the first set of solar collectors 102 are aligned to provide heat directly to the generator 106 by opening valve 126 and valve 128. In addition, during daytime hours, valves 130 and 132 are closed to cut off the flow path from the heat storage tank 138 to the generator 106. In addition, during nighttime hours when the incident solar radiation at the first set of solar collectors 102 is insufficient to enable the predetermined operating temperatures of the generator 106 to be reached, the heat storage tank 138 is aligned to provide heat to the generator 106 by opening valve 130 and valve 132. In addition, during nighttime hours, valves 126 and 128 are closed to cut off the flow path from the first set of solar collectors 102 to the generator 106. The heat storage tank 138 is also connected to a second set of solar collectors 104 via valve 134 and valve 136. Valves 134 and 136 are open during the daylight hours so that the solar energy captured by the second set of solar collectors 104 can be stored in the heat storage thank 138 until the nighttime hours when the thermal energy stored in the heat storage tank is used to maintain operational temperatures in the generator 106.

For the air conditioning system 200 described by FIG. 2, the use of the stored thermal energy in the cold storage tank 228 is regulated via the three-way valve 230. During daytime hours, the three-way valve 230 regulates refrigerant flow and redirects excess refrigerant to the cold storage tank 228. The excess refrigerant is stored in the cold storage tank 228 until nighttime and hours when the heat input from the solar collectors 202 is insufficient to separate the refrigerant from the absorbent-refrigerant solution at the generator 206 during daytime. In one implementation, the three-way valve 230 is manually operated to achieve predetermined rates of refrigerant flow to cool the daytime load 222 and to store in the cold storage tank 228. The position of the three-way valve 230 can also be controlled via circuitry based on changing load demands throughout the day.

For the air conditioning system 300 described by FIG. 3, the use of the stored thermal energy in the refrigerant storage tank 332 is regulated via valves 330 and 334. The refrigerant storage tank 332 is connected downstream of the condenser via condenser outlet valve 334 and refrigerant storage isolation valve 330. Condenser outlet valve 334 remains open during daytime hours to regulate the flow of refrigerant from the condenser 326 to the refrigerant storage tank 332. Refrigerant storage isolation valve 330 remains shut during daytime hours so that refrigerant accumulates in the refrigerant storage tank 332 and can be used to cool the at least one load 332 during the nighttime hours and when solar insulation is insufficient. During nighttime and hours when solar insulation is insufficient, the position of the refrigerant storage isolation valve 330 can be manually operated to regulate the flow of refrigerant from the refrigerant storage tank 332 to the evaporator 320. The position of the valve 330 can also be controlled via circuitry based on changing load demands throughout the nighttime hours.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if components in the disclosed systems were combined in a different manner, or if the components were replaced or supplemented by other components.

The invention claimed is:

1. An air-cooled, single-effect, air-conditioning system comprising:
    a first set of solar collectors configured to obtain energy to facilitate release of refrigerant from an absorbent-refrigerant solution in a refrigerant generator wherein the first set of solar collectors are directly connected to the refrigerant generator via a first flow path including a first set of isolation valves configured to isolate the first set of solar collectors from the refrigerant generator;
    an energy storage tank configured to store thermal energy for nighttime operations of the air conditioning system wherein the energy storage tank is directly connected to the refrigerant generator via a second flow path in parallel with the first flow path including a second set of isolation valves configured to isolate the energy storage tank from the refrigerant generator; and
    a second set of solar collectors configured to obtain the thermal energy stored in the energy storage tank wherein the second set of solar collectors are directly connected to the energy storage tank via a third flow path including a third set of isolation valves configured to isolate the second set of solar collectors from the energy storage tank.

2. The system of claim 1, wherein the absorbent-refrigerant solution is lithium bromide (LiBr)—water.

3. The system of claim 1, wherein the energy storage tank is a hot thermal storage tank that is aligned to directly provide thermal energy to the refrigerant generator via the second flow path to maintain operational temperatures in the refrigerant generator during the nighttime operations.

4. The system of claim 1, wherein the second set of solar collectors is further configured to operate at higher temperatures than the first set of solar collectors.

5. The system of claim 1, wherein the tank is a cold thermal storage tank connected downstream of an evaporator via a three-way valve.

6. The system of claim 5, wherein the three-way valve is further configured to regulate refrigerant flow to at least one daytime load.

7. The system of claim 6, wherein the three-way valve is further configured to divert excess refrigerant to the tank and to a daytime load.

8. The system of claim 6, wherein the tank is further configured to provide direct cooling to at least one nighttime load via cold thermal energy.

9. The system of claim 1, wherein the tank is a refrigerant storage tank connected downstream of a condenser to provide cooling to the at least one load during nighttime operations.

10. The system of claim 9, further comprising a refrigerant storage isolation valve configured to regulate flow of the refrigerant from the tank to an evaporator to maintain continuous cooling of the at least one load.

11. The system of claim 9, further comprising a condenser outlet valve configured to regulate flow of the refrigerant from the condenser to the tank.

12. The system of claim 9, wherein the tank is configured to operate at room temperature.

13. The system of claim 1, wherein the first set of isolation valves is configured to isolate the first set of solar collectors from the refrigerant generator when the energy tank is aligned to provide the energy to the refrigerant generator by opening the second set of isolation valves in the second flow path.

14. The system of claim 1, wherein the first flow path directly connecting the first set of solar collectors to the refrigerant generator bypasses the energy storage tank.

15. The system of claim 1, wherein the second set of isolation valves is configured to isolate the energy storage tank from the refrigerant generator when the first set of solar collectors are aligned to provide the energy to the refrigerant generator by opening the first set of isolation valves in the first flow path.

16. The system of claim 1, further comprising an evaporator configured to receive the refrigerant from a condenser to provide cooling to at least one load.

17. The system of claim 16, further comprising an absorber configured to facilitate absorption of the refrigerant received from the evaporator into an absorbent solution to produce the absorbent-refrigerant solution.

18. The system of claim 17, further comprising a pump configured to transfer the absorbent-refrigerant solution from the absorber to the refrigerant generator via a heat exchanger.

19. The system of claim 18, wherein the pump consumes electric power that is less than 0.1% of a total energy consumed by the system.

20. A method comprising:
    obtaining, via a first set of solar collectors directly connected to a refrigerant generator via a first flow path including a first set of isolation valves configured to isolate the first set of solar collectors from the refrigerant generator, energy to facilitate release of refrigerant from an absorbent-refrigerant solution in a refrigerant generator;
    storing, via an energy storage tank directly connected to the refrigerant generator via a second flow path in parallel with the first flow path including a second set of isolation valves configured to isolate the energy storage tank from the refrigerant generator, thermal energy for nighttime operations of an air conditioning system; and
    obtaining, via a second set of solar collectors directly connected to the energy storage tank via a third flow path including a third set of isolation valves configured to isolate the second set of solar collectors from the energy storage tank, the thermal energy stored in the energy storage tank.

* * * * *